United States Patent [19]

Fujita et al.

[11] Patent Number: 4,980,713
[45] Date of Patent: Dec. 25, 1990

[54] FILM MAGAZINE

[75] Inventors: Susumu Fujita, Nishinomiya; Takuro Teramoto, Gamagouri, both of Japan

[73] Assignee: Kowa Company Ltd., Japan

[21] Appl. No.: 469,131

[22] Filed: Jan. 24, 1990

[30] Foreign Application Priority Data

Jan. 26, 1989 [JP] Japan ............................. 1-7029

[51] Int. Cl.⁵ .............................................. G03B 17/26
[52] U.S. Cl. ..................................... 354/275; 354/211; 242/71.1
[58] Field of Search ....................... 354/211, 212, 275; 242/71.1

[56] References Cited

U.S. PATENT DOCUMENTS

| 461,306 | 10/1891 | Blair | 242/71.1 |
| 949,450 | 2/1910 | Scotchmer | 354/275 |
| 1,898,232 | 2/1933 | Widmann | 354/211 |
| 4,219,266 | 8/1980 | Carter | 242/71.1 |
| 4,340,292 | 7/1982 | Koch et al. | 242/71.1 |

Primary Examiner—A. A. Mathews
Attorney, Agent, or Firm—Bruce L. Adams; Van C. Wilks

[57] ABSTRACT

The film magazine in the invention includes a pair of pinch rollers for pinching a film reeled out from a film roll container against a flat back tray of the magazine. Release means are provided to release the film from the pinch rollers at the time of mounting the film magazine onto the body of the camera. The pinch rollers are urged so as to pinch the film against the back tray after the film magazine is demounted from the body of the camera. This arrangement makes it possible to restrain the film in the film magazine until it is mounted to the body of the camera. Once the film magazine is mounted on the body of the camera, the restraining mechanism is automatically released to allow free movement of the film.

5 Claims, 2 Drawing Sheets

FILM MAGAZINE

BACKGROUND OF THE INVENTION

1. Field of the Invention

This invention relates to a film magazine, and more particularly to a film magazine adapted for accommodating a film roll and for being mounted to the body of a camera having an imaging lens for recording an image on the film.

2. Description of the Prior Art

Film magazine devices for accommodating a photographic film are well known in the prior art. Particularly well known in the prior art is one variety of film magazine including a feeder roll portion for accommodating a non-perforated film and a take up roll portion for taking up the exposed film. In this film magazine, the feeder roll and the take up roll portions are disposed in opposite ends of a single integrally formed body which is removable from the body of the camera. In another well known variety of film magazine the take up roll portion can be removed from the camera body separately from the feeder roll portion.

In the devices according to the prior art described above, when there is a non-exposed film remaining on the feeder roll, it is extremely difficult to cut away and remove the exposed portion of film in order to develop it, while allowing the non-exposed portion of the film to remain in the magazine. This is particularly difficult in cameras in which the take up roller on which the exposed portion of the film is taken is not removable from the body of the camera. This problem is commonly encountered in indirect exposure photography techniques such as X-ray photography in which only a limited handling space is given.

SUMMARY OF THE INVENTION

It is therefore an object of the present invention to solve the above-mentioned problems and to provide an easy-to-use film magazine which is capable of drastically reducing the possibility of operational failures.

According to the invention there is provided a film magazine adapted for accommodating a film roll and for being detachably mounted to the body of a camera having an imaging lens for recording an image on the film. The film magazine comprises a film roll container section in which a non-exposed film is accommodated in a roll, a back tray portion disposed adjacent to the film roll container section for maintaining a portion of film reeled out therefrom to be flat for exposure by means of the imaging lens, means for pinching the film reeled out onto the back tray portion, means for urging the pinching means against the back tray portion to pinch the film between the pinching means and the back tray portion, and release means for applying pressure to the pinching means to displace the pinching means off the back tray portion so as to release the film from the pinching means. In this arrangement, the release means is activated to release the film from the pinching means at the time of mounting the film magazine onto the body of the camera, and deactivated to pinch the film between the pinching means and the back tray portion at the time of demounting the film magazine from the body of the camera.

Thus, this arrangement makes it possible to mount the film magazine to, or to remove the film magazine from, the body of the camera even in places in which a room for the mounting or removing operations is restricted. What is more with the arrangement according to the invention, it is impossible to restrain the film in the film magazine until it is mounted to the body of the camera. Once the film magazine is mounted to the body of the camera, the restraining mechanism for holding the film fixedly within the film magazine is automatically released. Thus the mounting and removing operation of the film magazine in accordance with the present invention is greatly simplified and can be carried out confidently and assuredly with the possibility of failure eliminated.

BRIEF DESCRIPTION OF THE DRAWINGS

The objects and features of the present invention will become more apparent from the accompanying drawings and the following detailed description of the invention.

DETAILED DESCRIPTION OF THE PREFERRED EMBODIMENTS

Figure 1:
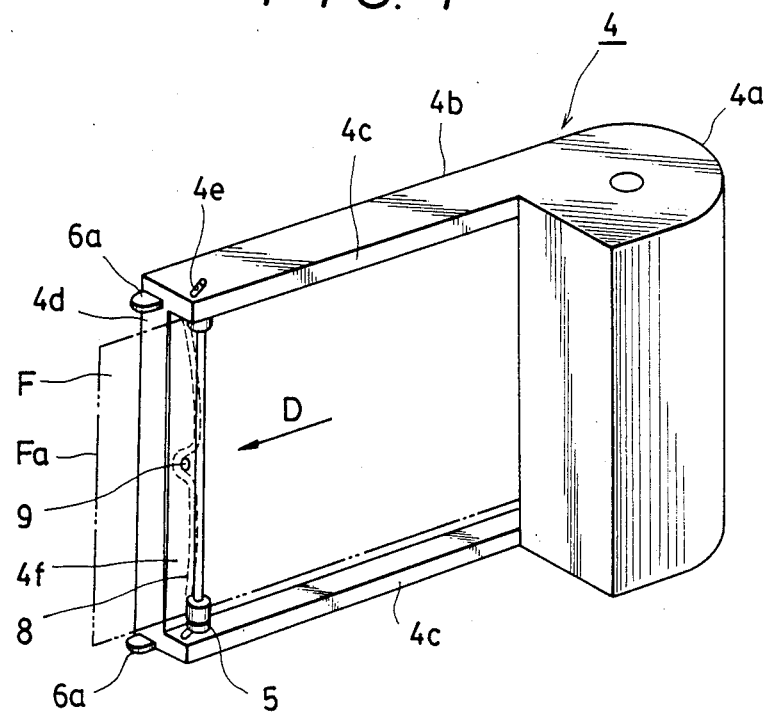
FIG. 1 is a perspective view showing a film magazine in accordance with the present invention.
Figure 2:
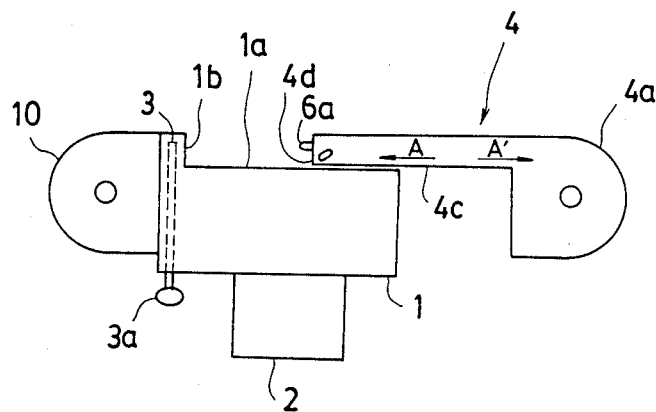
FIG. 2 is an plan view of the film magazine according to the present invention explanatorily showing the mounting or removal operation of the film magazine from the body of the camera.

The invention will now be described in detail with reference to preferred embodiments shown in the drawings.

FIGS. 1 through 4 show one embodiment of the present invention, in which a camera body 1 is provided with an imaging lens 2. A sliding surface 1a is formed on the camera body 1 for receiving a film magazine 4. The sliding surface 1a defines a plane which is normal to the optical path through the lens 2. Guide rails (not shown) are provided on the camera body for allowing the removable insertion of the film magazine onto the camera body in the direction indicated by the arrow A in FIG. 2.

When the film magazine 4 is properly loaded into its loading position on the camera body 1, an end surface 4d of the film magazine 4 comes into tight engagement with an engaging wall 1b of the camera body 1. As will be described later, an arm tip 6a is engaged by the engaging wall 1a and, when the film magazine is loaded onto the camera body, is pushed thereby into a position wherein it is flush relative to the surface 1b.

In the immediate vicinity of the engaging surface 1b of the camera body 1 a film cutter 3 is provided for cutting a film F. The film cutter 3 is operable from outside of the body 1 of the camera by means of a film cutter lever 3a. A film take up magazine 10 is removably mounted on the camera body 1 in the immediate vicinity of the film cutter 3 for providing a removable system for reeling up the exposed portion of the film.

The film magazine 4 comprises a film container section 4a which accommodates the film F in a rolled up condition. The film magazine further includes a back tray portion 4b which is formed integrally with the film container portion 4a so as to be immediately adjacent thereto. The back tray portion 4b is formed so as to maintain a portion of the film F drawn out of the container portion 4a in a state in which it defines a flat surface at the back screen portion of the camera body.

The back tray 4b comprises a pair of guide slots 4e formed in the immediate vicinity of the end surface 4d. The slots 4e are formed at the top and bottom sides of the back tray 4b and are defined at an angle with respect of the direction of the film F along which it is drawn out of the film container portion 4a. Also provided on the back tray 4b are a pair of pinch rollers 5. A pair of pins 5b are provided at the ends of the pinch rollers 5, and are engagingly received in the guide slots 4e in such a manner as to be longitudinally slidable and rotatable within the slots 4e.

The roller 5 comprises a pair of annular slots 5a formed at either end thereof in the vicinity of the pins 5b. The annular slots 5a formed in the roller 5 accommodate the opposite ends of a spring member 8. The spring member 8 is provided in the back tray 4b and is maintained therewithin by means of a holder stud 9. The holder stud 9 is formed so a to retain the spring member 8 at its longitudinal center portion. A pinch plate 4f is fixed to the back tray 4b. The spring member 8 serves to engage the annular slots 5a formed at the ends of the pinch rollers 5 so as to apply a resilient pressure thereto for constantly urging the pinch rollers 5 in the direction indicated by the arrow C in FIG. 3a and 4. In this manner, by means of the resilient pressure applied to the annular slots in the ends of the pinch rollers 5 the pinch rollers 5 are resiliently urged against the pinch plate 4f. The end of the film F can then be inserted between the pinch roller 5 and the pinch plate 4f (see the direction D in FIG. 1), thereby causing a slight displacement of the pinch roller 5 for accommodating the film F.

The angle of the guide slot 4e is determined in advance to be the best angle for directing the resilient pressure applied to the pinch roller 5 by means of the spring member 8 so as to allow the sandwiching of the film F between the pinch plate 4f and the pinch roller 5.

Figure 3A:
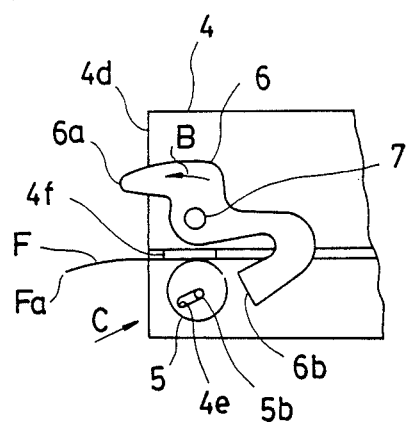
FIGS. 3a and 3b are enlarged side elevator views showing an essential feature of the film magazine constructed in accordance with the principles of the present invention, depicting a state in which the film magazine has not been mounted to the body of the camera and a state in which the film magazine has been mounted to the body of the camera.
Figure 3B:
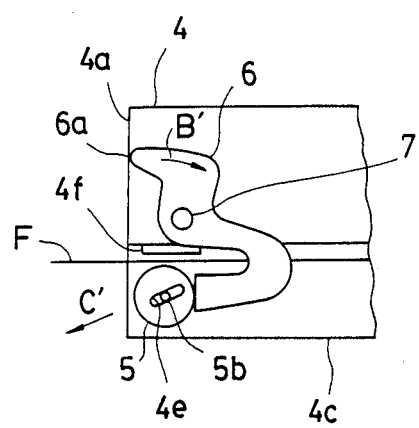
Figure 4:
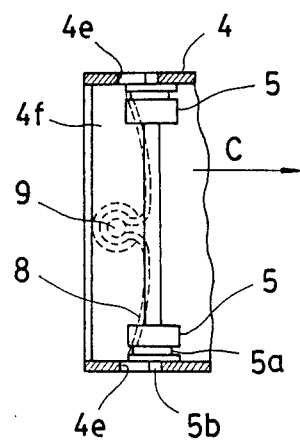
FIG. 4 is a partial enlarged cutaway view showing an essential portion of a film magazine according to the present invention.

As will be seen from FIGS. 3a and 3b, a pair of release arms 6 are provided at the top and bottom sides 4d of the back tray 4b. The release arms are pivotally fastened to the back tray 4b by means of a journal pin 7 provided on the back tray at a portion thereof near the end face 4d, which defines their pivoting axis. The release arms 6 include engaging tips 6a, and are located at a portion of the back tray 4b which is near the end edge 4b so that the tips 6a of the release arms may protrude beyond the edge 4d. The release arms 6 are urged in the direction indicated by the arrow B by means of a spring (not shown in the FIGS. 3a and 3b). When the film magazine 4 is not received on the body 1 of the camera, the release arms 6 are urged by the spring so as to be positioned in a position as shown in FIG. 3a so that the engaging tips 6a protrude beyond the end surface 4d.

At the ends of the release arms 6 opposite from the engaging tips 6a, engaging surfaces 6b are formed each of which engages the corresponding pinch roller 5 for applying an urging pressure thereto so as to slide the pinch roller 5 longitudinally within the guide slots 4e.

The operation of the above described embodiment of a film magazine in accordance with the principles of the present invention will now be described in detail.

First, an unexposed roll of photographic film is loaded into the film container portion 4a of the film magazine 4. The end portion of the roll film is drawn out from film container portion 4a in the direction D shown in FIG. 1. Thereafter, the end portion of the drawn from the film container portion 4a is inserted between the pinch roller 5 and the pinch plate 4f so as to be gripped therebetween. In this state, the tip portion Fa of the film F protrudes slightly beyond the end edge surface 4d of the back tray 4b. FIG. 3a shows the film magazine 4 in this state, in which, even if pressure is applied to the film F in the direction opposite that indicated by the arrow D of FIG. 1, the engaging pressure of the pinch roller 5 urging the film F against the pinch plate 4f prevents the film F from being removed from the film magazine 4.

Next, the film magazine 4 is mounted to the mounting surface 1a of the camera body 1. By means of the sliding engagement between the guide rails (not shown) and /or other guiding means formed on the mounting surface 1a of the camera body 1 and the engaging surfaces 4c of the back tray 4b, the film magazine 4 is slidably guided onto the rear portion of the camera body 1 in the direction indicated by the arrow A shown in FIG. 2, so that the end edge surface 4d comes into contact with the engaging wall 1b of the camera body 1 so as to be flush thereagainst.

At this time the engaging tip 6a of the release arm 6 comes into engagement with the engaging wall 1b so as to be pushed thereby. This engagement urges the arm 6 to rotate in the direction indicated by the arrow B' shown in FIG. 3b. In the above manner the arm 6 is rotated so as to bring the engaging end surface 6b into engagement with the pinch roller 5. Thus the pinch roller 5 is driven in the direction indicated by the arrow C' shown in FIG. 3b. In this matter the pinch roller 5 is driven away from the pinch plate 4f in such a manner that a gap is defined therebetween.

Thus, according to the above operation, when the film magazine 4 has been loaded onto the body 1 of the camera, a gap is established between the pinch roller 5 and the pinch plate 4f and film F, which had been pinched therebetween, becomes free so that it may be wound from the film magazine 4 into the take up reel portion 10.

When the film has been partially let out for exposure and it becomes necessary to remove the film magazine 4 from the body 1 of the camera, the cutter 3 may be operated by means of the handle 3a for cutting the film F. After the film F has been cut by means of the cutter 3, the exposed portion of the film F remains received within the take up reel portion 10. Therefore it becomes possible to release a lock mechanism and/or other means and to remove the film magazine 4 from camera body 1 in the direction indicated by the arrow A' of FIG. 2.

When the film magazine 4 has been removed from the body 1 of the camera, it assumes the condition shown in FIG. 3a, in which the spring (not shown in the Figure) urges the arm 6 again back to rotate in the direction indicated by the arrow B. Thus the engaging pressure exerted by the engaging surface 6b of the pinch roller 5 is released. This causes the pinch roller 5 to be free to be urged by the spring 8 in the direction indicated by the arrow C of FIG. 3. Thus the spring 8 returns the pinch roller 5 to a state in which it is applying pressure on the pinch plate 4 so as to pinch the end of the film F therebetween. In this manner the film F becomes locked into the film magazine 4 and cannot be removed therefrom.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention should not be limited to the particular embodiment disclosed as the best mode contemplated for carrying out the invention, but that the invention will include all embodiments falling within the scope of the appended claims.

What is claimed is:

1. A film magazine adapted for accommodating a film roll and for being detachably mounted to the body of a camera having an imaging lens for recording an image on the film, comprising:
    a film roll container section in which a non-exposed film is accommodated in a roll:
    a back tray portion disposed adjacent to the film roll container section for maintaining a portion of film reeled out therefrom to be flat for exposure by means of the imaging lens:
    means for pinching the film reeled out onto the back tray portion:
    means for urging the pinching means against the back tray portion to pinch the film between the pinching means and the back tray portion; and
    release means for applying pressure to the pinching means to displace the pinching means off the back tray portion so as to release the film from the pinching means;
    wherein the release means is activated to release the film from the pinching means at the time of mounting the film magazine onto the body of the camera, and deactivated to pinch the film between the pinching means and the back tray portion at the time of demounting the film magazine from the body of the camera.

2. A film magazine as set forth in claim 1, wherein the film roll container section is formed integrally with the back tray portion.

3. A film magazine as set forth in claim 1, wherein a portion of the film remains pinched between the pinching means and the back tray portion after the film magazine is removed from the camera body.

4. A film magazine as set forth in claim 1, wherein a portion of the film remains released from the pinching means after the film magazine is mounted on the camera body.

5. A film magazine as set forth in claim 4, wherein a gap is defined between the pinching means and the back tray portion, the width of the gap being greater than the thickness of the film.

* * * * *